UNITED STATES PATENT OFFICE.

BENNO HOMOLKA, OF FRANKFORT-ON-THE-MAIN, AND AUGUST STOCK, OF HÖCHST-ON-THE-MAIN, GERMANY, ASSIGNORS TO THE FARBWERKE, VORMALS MEISTER, LUCIUS & BRÜNING, OF HÖCHST-ON-THE-MAIN, GERMANY.

PROCESS OF OBTAINING ORTHO AND PARA NITRO BENZALDEHYDE.

SPECIFICATION forming part of Letters Patent No. 636,994, dated November 14, 1899.

Application filed December 15, 1897. Serial No. 662,030. (No specimens.)

*To all whom it may concern:*

Be it known that we, BENNO HOMOLKA, doctor of philosophy, a citizen of the Empire of Austria-Hungary, residing at Frankfort-on-the-Main, and AUGUST STOCK, a citizen of the Empire of Germany, residing at Höchst-on-the Main, Germany, have invented certain new and useful Improvements in the Manufacture of Ortho-Nitrobenzaldehyd and Para-Nitrobenzaldehyd, (for which we have obtained Letters Patent in Germany, No. 93,539, dated February 21, 1897, and No. 97,948, dated September 3, 1897; in France, No. 273,423, dated December 22, 1897, and in England, No. 30,118, dated December 20, 1897,) of which the following is a description.

This invention relates to the production of ortho-nitrobenzaldehyd and para-nitrobenzaldehyd.

The nitrobenzylidenanilinsulfonic acids of the general formula:

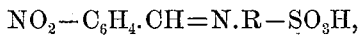

where R represents the aromatic radical of benzene, $C_6H_4$ of toluene, $C_7H_6$ of xylene, $C_8H_8$ or of naphthalin, which may be obtained according to our application of this day in form of their salts, are, as we have found, only able to exist in form of their salts. Freed from these salts by means of diluted mineral acids they decompose at once in presence of water into nitrobenzaldehyd and anilinsulfonic acid (or a homologue of the same) according to the following equation:

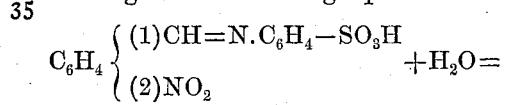
Ortho-nitrobenzyliden-anilinsulfonic acid.

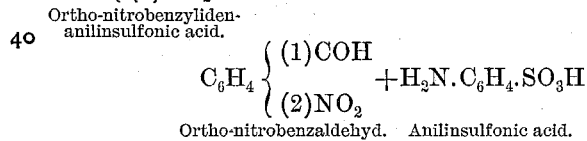
Ortho-nitrobenzaldehyd. Anilinsulfonic acid.

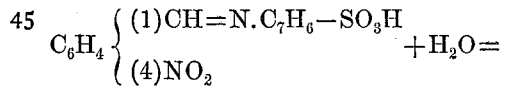
Para-nitrobenzyliden-toluidinsulfonic acid.

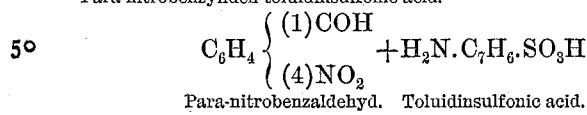
Para-nitrobenzaldehyd. Toluidinsulfonic acid.

This behavior of the aromatic nitrobenzylidensulfonic acids offers a simple means for the manufacture of ortho- and para-nitrobenzaldehyd.

To illustrate the practical application of our process, we proceed, for instance, as follows:

*Manufacture of para-nitrobenzaldehyd from para-nitrobenzylidenanilinsulfonic acids.*—Thirty-three kilograms para-nitrobenzylidensulfonate of sodium or the equivalent quantities of para-nitrobenzyliden-toluidinsulfonate of sodium, para-nitrobenzyliden-xylidinsulfonate of sodium, or para-nitrobenzyliden naphthylaminsulfonate of sodium are dissolved in about fifteen hundred liters of warm water, whereupon a quantity of dilute mineral acid ($HCl, SO_4H_2$, &c.) equivalent to the quantity of present sodium salt is added. By these means para-nitrobenzylidenanilinsulfonic acid is set free and decomposes at once, according to the equations mentioned above, into para-nitrobenzaldehyd and anilinsulfonic acid or toluidin- or xylidinsulfonic acids. The para-nitrobenzaldehyd is soluble with difficulty in water, therefore separates, is filtered, and dried. In the filtrate remains dissolved the anilinsulfonic acid, toluidin- or xylidinsulfonic acid. In the same way ortho-nitrobenzaldehyd is obtained if instead of the above-mentioned para-nitrobenzylidenanilin-toluidin- xylidin- or naphthylaminsulfonic acids the ortho-nitrobenzyliden-anilin, toluidin, xylidin, or naphthylaminsulfonic acids be used and less water employed. As, however, ortho-nitrobenzaldehyd is far more soluble in water than para-nitrobenzaldehyd, it does not separate so completely as the latter. It is therefore necessary to obtain the residual ortho-nitrobenzaldehyd either by extraction with ether or benzene (toluene, xylene, &c.) or by distilling off with steam. This circumstance renders the process far more difficult and costly, and we consequently endeavored to find a better process for the manufacture of ortho-nitrobenzaldehyd. We succeeded in finding such a process by making use of a second peculiar chemical reaction which is characteristic for the ortho- and para-nitrobenzyliden-anilin (toluidin- and xylidin-) sulfonic acids. If, for instance, upon the aqueous solution of a salt of an ortho- or para-nitrobenzyliden-anilin (toluidin- or xylidin-) sulfonic acid the aqueous solution of a salt of a primary aromatic base—such as anilin, toluidin, xylidin, or naphthylamin—is allowed to act, a reaction takes place by which one obtains, first, anilin- (toluidin-, xylidin-, or naphthylamin) sulfonic acid; second, the ortho- or para-nitrobenzyliden compound of anilin, (toluidin, xylidin, naphthylamin,) and, third, chlorid of sodium (or another inorganic alkalin salt) according, for instance, to the following equations:

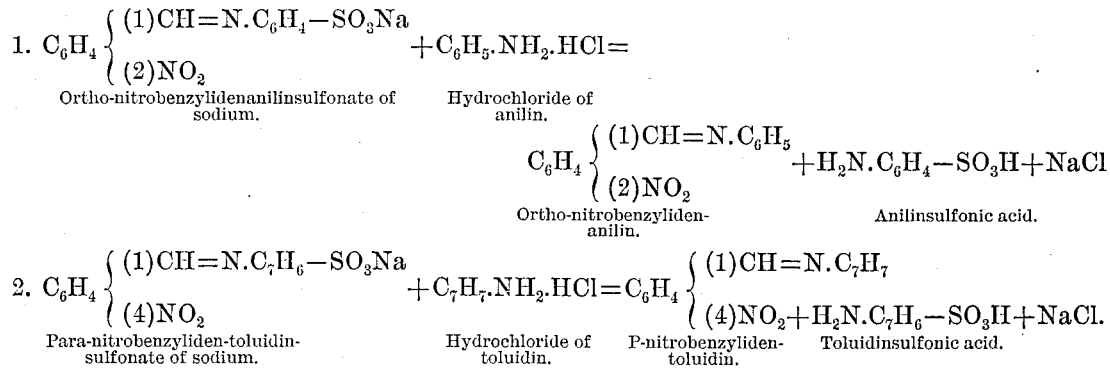

Of the products of reaction thus obtained the anilin- (toluidin- xylidin-) sulfonic acid and the chlorid of sodium are soluble in water. The ortho- or para-nitrobenzyliden base, however, is completely insoluble in water, therefore separates and may be decomposed after filtering off in the usual way with diluted mineral acids into ortho- or para-nitrobenzaldehyd and the anilin base according to the equation:

$NO_2-C_6H_4.CH:N.C_6H_5+H_2O=$
Para- or ortho-nitrobenzylidenanilin.

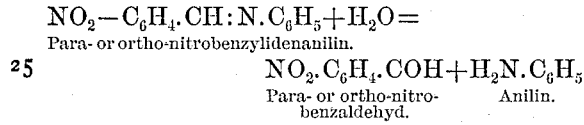

For the production of ortho-nitrobenzaldehyd we proceed, for instance, as follows: Thirty-three kilograms of ortho-nitrobenzylidenanilinsulfonate of sodium or the equivalent quantity of a salt of ortho-nitrobenzyliden- toluidin, xylidin, or naphthylamin-sulfonic acid are dissolved in about one thousand to fifteen hundred liters of water, to which is added, with stirring, a solution of 14.5 kilograms hydrochloride of toluidin (or the equivalent quantity of another toluidin salt or of an anilin- or xylidin- or naphthylamin salt.) The reaction takes place as above described, when the entire ortho-nitrobenzaldehyd separates in form of ortho-nitrobenzyliden-toluidin. The latter is separated from the liquid and decomposed in the usual way with diluted mineral acids into ortho-nitrobenzaldehyd and toluidin. In the same way para-nitrobenzaldehyd is obtained from para-nitrobenzyliden- anilin- toludin- xylidin- or naphthylamin-sulfonic acids.

Having now described our invention, what we claim is—

The herein-described process of producing ortho- and para-nitrobenzaldehyd, which consists in bringing nitrobenzylidenanilinsulfonates, where the nitro group is in ortho or para position to the CH group, into reaction with the salts of a primary aromatic base, and then treating the nitrobenzyliden bases thus obtained in the usual manner with diluted mineral acids, substantially as set forth.

In testimony that we claim the foregoing as our invention we have signed our names in presence of two subscribing witnesses.

BENNO HOMOLKA.
AUGUST STOCK.

Witnesses:
HEINRICH HAHN,
ALFRED BRISBIN.